US010524229B2

(12) United States Patent
Fan et al.

(10) Patent No.: US 10,524,229 B2
(45) Date of Patent: Dec. 31, 2019

(54) METHOD AND DEVICE FOR TRANSMITTING TRACKING AREA INFORMATION

(71) Applicant: Telefonaktiebolaget LM Ericsson (publ), Stockholm (SE)

(72) Inventors: Rui Fan, Beijing (CN); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 101 days.

(21) Appl. No.: 15/544,806

(22) PCT Filed: Aug. 3, 2016

(86) PCT No.: PCT/CN2016/093101
§ 371 (c)(1),
(2) Date: Jul. 19, 2017

(87) PCT Pub. No.: WO2018/023500
PCT Pub. Date: Feb. 8, 2018

(65) Prior Publication Data
US 2019/0014552 A1 Jan. 10, 2019

(51) Int. Cl.
*H04W 68/02* (2009.01)
*H04W 8/12* (2009.01)
(Continued)

(52) U.S. Cl.
CPC ............ *H04W 68/02* (2013.01); *H04W 8/12* (2013.01); *H04W 60/00* (2013.01); *H04W 64/003* (2013.01); *H04W 72/042* (2013.01)

(58) Field of Classification Search
None
See application file for complete search history.

(56) References Cited

U.S. PATENT DOCUMENTS 9,357,449 B2 * 5/2016 Suh .................... H04W 36/0066
2010/0317349 A1 * 12/2010 Serravalle ............. H04W 48/20
455/440

(Continued)

FOREIGN PATENT DOCUMENTS

CN 101588571 A 11/2009
CN 101626617 A 1/2010
(Continued)

OTHER PUBLICATIONS

PCT International Search Report for International application No. PCT/CN2016/093101—dated Apr. 27, 2017.
(Continued)

*Primary Examiner* — George C Atkins
(74) *Attorney, Agent, or Firm* — Baker Botts, LLP (57) ABSTRACT

Embodiments of the disclosure generally relate to transmission of TA information in a non-paging procedure. A network device receives, from a source node, a first message that is a non-paging message. The source node is one of a terminal device and a control device in a core network. Then, the network device obtains TA information about the terminal device from the first message and transmits, to a destination node, a second message generated based on the first message. The destination node is the other of the terminal device and the control device.

10 Claims, 6 Drawing Sheets

(51) Int. Cl.
*H04W 64/00* (2009.01)
*H04W 60/00* (2009.01)
*H04W 72/04* (2009.01)

(56) References Cited

U.S. PATENT DOCUMENTS

| | | | | |
|---|---|---|---|---|
| 2010/0329213 | A1* | 12/2010 | Hayashi | H04W 24/02 370/331 |
| 2013/0039287 | A1* | 2/2013 | Rayavarapu | H04W 68/005 370/329 |
| 2013/0337797 | A1* | 12/2013 | Ban | H04W 84/00 455/422.1 |
| 2014/0106790 | A1 | 4/2014 | Kakinada et al. | |
| 2016/0205659 | A1* | 7/2016 | Bergman | H04L 1/1812 370/252 |
| 2017/0164317 | A1* | 6/2017 | Kuge | H04W 60/04 |
| 2018/0020382 | A1* | 1/2018 | Kim | H04W 36/0055 |
| 2018/0070331 | A1* | 3/2018 | Byun | H04W 36/00 |
| 2018/0249361 | A1* | 8/2018 | Otsuki | H04W 16/18 |

FOREIGN PATENT DOCUMENTS

| | | |
|---|---|---|
| CN | 101983526 A | 3/2011 |
| CN | 102196401 A | 9/2011 |
| WO | 2011038359 A2 | 3/2011 |

OTHER PUBLICATIONS

3GPP TS 23.401 v8.5.0; Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 8)—Mar. 2009.
PCT Written Opinion of the International Searching Authority for International application No. PCT/CN2016/093101—dated Apr. 27, 2017.

* cited by examiner

METHOD AND DEVICE FOR TRANSMITTING TRACKING AREA INFORMATION

PRIORITY

This nonprovisional application is a U.S. National Stage Filing under 35 U.S.C. § 371 of International Patent Application Serial No. PCT/CN2016/093101 filed Aug. 3, 2016, and entitled "Method and Device for Transmitting Tracking Area Information."

TECHNICAL FIELD

Embodiments of the present disclosure generally relate to the field of communications, and more particularly, to a method and device for transmitting tracking area (TA) information in a wireless communication system.

BACKGROUND

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying length of waiting period in between (also referred to as an "inactive state"). For such traffic it is important to both optimize the inactive state between the data bursts as well as the transition to an active state. The signaling related to inactive devices should be minimized by having relaxed requirements on mobility tracking in inactive state, while the state transition can be optimized by keeping and re-using the device context when the device returns. At the same time it is also important to minimize the UE battery consumption both in active and inactive state.

Conventionally, paging is bundled with TA information. For instance, in Long Term Evolution (LTE) systems, TA is a concept defined in Core Network (CN). Once a terminal device, for example, user equipment (UE), attaches to Mobile Management Entity (MME), it knows the TA information assigned by the MME and then knows when and how to report its location to the MME via Tracking Area Update procedure, included in a Non-access Stratum (NAS) message.

Since TA information is managed in the CN, a device in an accessing network (also referred to as a "network device") does not know all the possible locations of a UE. When there is a task of paging in an accessing network, for example, Radio Access Network (RAN), the network device can only page the UE within its managed cells. However, broadcasting paging from the access network will incur both long delay and unnecessary overhead.

SUMMARY

In general, embodiments of the present disclosure provide a solution for transmitting TA information to the network device in a non-paging procedure to reduce overhead and delay cause by broadcasting paging from the access network.

In a first aspect, a method implemented at a network device is provided. In the method, a network device receives, from a source node, a first message that is a non-paging message. The source node is one of a terminal device and a control device in a core network. Then, the network device obtains TA information about the terminal device from the first message and transmits, to a destination node, a second message generated based on the first message. The destination node is the other of the terminal device and the control device. The corresponding computer program is also provided.

In one embodiment, the source node may be the control device. In the embodiment, the network device may receive the first message by: receiving an attach accept message from the control device, the attach accept message being sent from the control device in response to a network attach request from the terminal device; receiving a TA update accept message from the control device, the TA update accept message being sent from the control device in response to a TA update request from the terminal device; or receiving an initial context setup request message from the control device, the initial context setup request message being sent from the control device in response to a service request from the terminal device.

In one embodiment, the source node may be the terminal device. In the embodiment, the network device may receive the first message by: receiving a network attach complete message from the terminal device; or receiving a TA update complete message from the terminal device.

In one embodiment, the TA information may include a list of tracking area identities (TAIs). A TAI may identify a region where the terminal device has been registered.

In one embodiment, the network device may further determine, in response to receiving a packet from the CN to the terminal device, a first set of cells based on the TA information. The first set of cells may include all cells managed by the network device and belonging to a region where the terminal device has been registered. Then, the network device may send a paging message for paging the terminal device in the first set of cells.

In one embodiment, the network device may further determine, in response to no response regarding the paging message from the terminal device, a second set of cells based on the TA information. The second set of cells may include all cells managed by a neighbor device of the network device and belonging to a region where the terminal device was registered. Then, the network device may send a paging request to the neighbor device for paging the terminal device in the second set of cells.

In one embodiment, the network device may determine the second set of cells by obtaining a TA code (TAC) of the neighbor device from a message exchanged with the neighbor device, e.g. X2SetupRequest; and determining the second set of cells based on the TAC of the neighbor device.

In a second aspect, a method implemented at a source node is provided. The source node may be one of a terminal device and a control device in a CN. The source node generates a first message including TA information about the terminal device. The first message is a non-paging message. Then, the source node sends the first message to a network device to enable the network device to transmit, to a destination node, a second message generated based on the first message. The destination node is the other of the terminal device and the control device. The corresponding computer program is also provided.

In a third aspect, a network device is provided. The network device includes a transceiver and a processing unit. The transceiver is configured to receive, from a source node, a first message that is a non-paging message. The source node is one of a terminal device and a control device in a CN. The processing unit is configured to obtain TA information about the terminal device from the first message. The transceiver is further configured to transmit, to a destination node, a second message generated based on the first message. The destination node is the other of the terminal device and the control device.

In a fourth aspect, a source node is provided. The source node is one of a terminal device and a control device in a CN, and includes a transceiver and a processing unit. The processing unit is configured to generate a first message including TA information about the terminal device. The first message is a non-paging message. The transceiver is configured to send the first message to a network device to enable the network device to transmit, to a destination node, a second message generated based on the first message. The destination node is the other of the terminal device and the control device.

In a fifth aspect, a device is provided. The device includes a processor and a memory. The memory containing instructions executable by the processor, whereby the processor being adapted to cause the device to perform the method according to the first aspect of the present disclosure.

In a sixth aspect, a device is provided. The device includes a processor and a memory. The memory containing instructions executable by the processor, whereby the processor being adapted to cause the device to perform the method according to the second aspect of the present disclosure.

According to some embodiments of the present disclosure, TA can be provided to the network device in a non-paging procedure. As such, overhead and delay caused by broadcasting paging from the access network can be reduced. In this way, paging at the accessing network can be done accurately without incurring long paging delay or much overhead.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "network device" refers to a device in an accessing network, such as a RAN, a cloud system, and the like, through which a terminal device may access a communication network and receives services therefrom. The network device refers to a base station (BS), an access point (AP), a server or any other suitable device in the accessing network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a communication network via an accessing network and receive services therefrom. By way of example and not limitation, the terminal device refers to a mobile terminal, UE, or other suitable device. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, a pedestrian and the like.

The term "control device" refers to a device in the core network that can control procedures such as attaching, accessing, paging, information updating, and so on. The control device may be, for example, a Mobility Management Entity (MME), a Multi-cell/multicast Coordination Entity (MCE), a gateway, a controller, a server in the core network.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In embodiments of the present disclosure, the communication network may refer to a network following any suitable wireless communication standards, such as LTE-Advanced (LTE-A), LTE, Wideband Code Division Multiple Access (WCDMA), High-Speed Packet Access (HSPA), and so on. Furthermore, the communications between devices in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Figure 1:
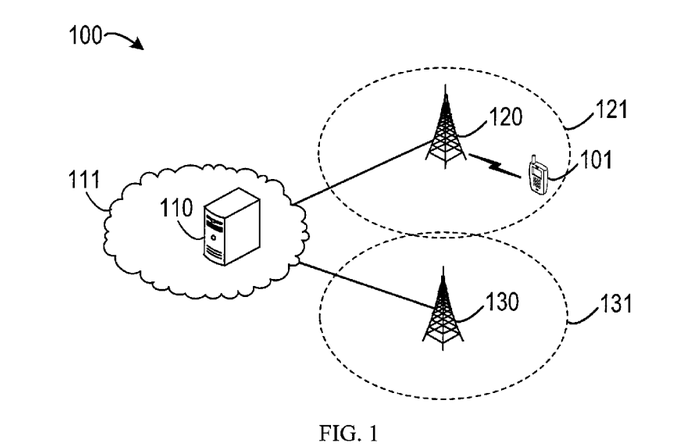
FIG. 1 shows an environment 100 in which embodiments of the present disclosure may be implemented.

Reference is first made to FIG. 1, which illustrates an environment 100 in which embodiments of the present disclosure may be implemented. The environment 100 illustrates a control device 110 in a CN 111, two network devices 120 and 130 managing cells 121 and 131 respectively, and a terminal device 101 in the cell 121. The network devices 120 and 130 belong to an accessing network. In the shown example, the terminal device 101 may be served by the networks device 120. When moving to the cell 131, the terminal device 101 may be served by the network device 130.

Conventionally, when the network device 120 has a task of paging, if the TA information is defined in the CN 111, it would be unclear how to do paging in RAN. for instance, when there is a DL packet toward the terminal device 101 arrived at the network device 120 which maintains a S1 connection with the CN 111 for the terminal device 101, the network device 120 can only page the terminal device 101 from all the cells managed by itself as it does not know what are the other possible area the terminal device 101 might locate. This will reduce the paging accuracy when the terminal device 101 moves just to the cell 131 which is managed by a neighbor of the network device. If the network device 120 asks the CN 111 to page the terminal device 101 in case it does not successfully get a response from the terminal device 101, a long delay will be introduced, for example, when the terminal device 101 is just within the cell 131. Such blindly paging in RAN would cause extra paging messages and long paging delay.

In order to solve the above and other potential problems, embodiments of the present disclosure provides a solution to reduce overhead caused by transmission of the TA information. In accordance with embodiments of the present disclosure, in a non-paging procedure, the network device 120 obtains the TA information from a first message which is received from the terminal device 101 or the control device 110. As such, overhead caused by broadcasting TA information from the CN 111 can be reduced, and the paging can be done accurately without incurring long paging delay.

It is to be understood that the configuration of FIG. 1 is described merely for the purpose of illustration, without suggesting any limitation as to the scope of the present disclosure. Those skilled in the art will appreciate that the enviromnent 100 may include any suitable number of network devices and terminal devices, or any kind of accessing networks.

Figure 2:
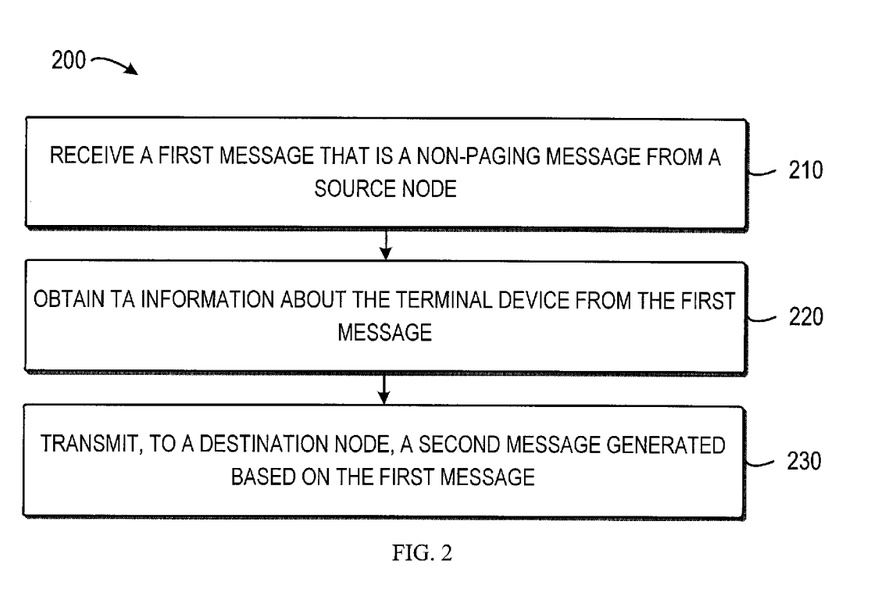
FIG. 2 shows a flowchart of a method 200 in accordance with an embodiment of the present disclosure.

Now reference is made to FIG. 2, which shows a flowchart of a method 200 in accordance with an embodiment of the present disclosure. With the method 200, the above and other potential deficiencies in the conventional approaches can be overcome. It would be appreciated by those skilled in the art that the method 200 may be implemented by a network device, such as the network node 120 or other suitable devices.

The method 200 is entered in block 210, where the network device receives, from a source node, a first message that is a non-paging message. The network device may be a BS in an access network. In an embodiment, the access network may be configured by a network operator and includes a collection of various different nodes, devices or functions that are capable of communication with each other via corresponding wired and/or wireless interfaces. As such, the illustration of network devices 120 and 130 should be understood to be an example of a broad view of certain elements of the access network and not inclusive or detailed view of the access network. Although not necessary, in some embodiments, the access network may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like. For example, the access network may be a GERAN, UTRAN, HSPA or E-UTRAN access network.

According to embodiments of the present disclosure, the source node is one of a terminal device and a control device in a CN, and a destination node to which the first message is directed is the other one of the terminal device and the control device.

In the example shown in FIG. 1, if the source node is the control device 110, then the destination node is the terminal device 101, and the first message may be a downlink message, for example, an attach accept message, a TA update accept message, an initial context setup request message, and so on. On the other hand, if the source node is the terminal device 101, then the destination node is the control device 110, and the first message may be an uplink message, for example, a network attach complete message, a TA update complete message, and the like. It would be understood that, the above examples of the first message are just described for illustration, rather than limitation. Those skilled in the art would readily appreciate that the first message may have many other suitable forms or implemented in many other suitable ways.

According to embodiments of the present disclosure, the network device may receive the first message in a variety of ways. In some embodiments, the source node is the control device. In response to a network attach request from the terminal device, the control device may send an attach accept message to the terminal device. In this case, the network device may receive the attach accept message from the control device as the first message.

Alternatively, in some embodiments, in response to a TA update request from the terminal device, the control device may send a TA update accept message to the terminal device. In this case, the network device may receive the TA update accept message from the control device as the first message.

As a further alternative, in some embodiments, the control device may send an initial context setup request message in response to a service request from the terminal device. In this case, the network device may receive the initial context setup request message from the control device as the first message.

In addition to the above embodiment, the first message may be received in several other ways when the source node is the terminal device. In an embodiment, the network device may receive a network attach complete message from the terminal device. In this case, the network attach complete message may be considered as the first message containing the TA information. In an alternative embodiment, the network device may receive a TA update complete message from the terminal device. In this case, the TA update complete message may be considered as the first message containing the TA information.

In block 220, the network device obtains TA information about the terminal device from the first message. Conventionally, when a UE initially attaches to an LTE network, the UE is registered to the network by an MME. The MME allocates a TAI list to the UE at its initial attach, and keeps track of its location thereafter. For this, the UE informs the MME of its new location and requests for TA update whenever it leaves its registered tracking area identity (TAI). In this way, the MME knows in which TA the UE is currently located, and keeps the TAI list of the UE updated. The UE does not have to request TA update if travelling to a TA listed in a TAI list. However, if the current TA renewal period is expired, the UE has to inform the MME of its current TA, even while staying in TAs listed in the list, and let the MME know that it is able to receive data. Once UE attaches to MME, it knows the TAI list assigned by MME and then know when and how to report its location to MME via Tracking Area Update procedure In embodiments of the present disclosure, the TA information refers to the information about the tracking area. In an embodiment, the TA information may include a list of TAIs (also referred to as a "TAI list"), and each TAI in the TAI list identifies a region where the terminal device has been registered. A TAI may include a Public Land Mobile Network (PLMN) identifier (ID) and a TA code (TAC). The PLMN ID consists of a Mobile Country Code (MCC) and a Mobile Network Code (MNC). Both the TAI and the TAC may be used for identifying. The TAC may be used to identify a TA in a network of an operator, whereas the TAI, which is a combination of the PLMN ID and the TAC, is used to uniquely identify a TA globally.

In some embodiments, the TA information is stored at the control device, for example in a readable storage medium, such as a random access memory (RAM), a read-only memory (ROM), and the like. The control device may incorporate a copy of the TA information into the first message before transmitting it to the terminal device via the network device. The first message may also include a NAS message for the terminal device. Thus, upon receipt of the first message, the network device may obtain the TA information from the first message, and then generates a second message based on the NAS message of the first message according to predefined protocols.

In block 230, the network device transmits, to a destination node, a second message generated based on the first message, the destination node being the other of the terminal device and the control device. The second message may be generated from the first message according to interfaces among the control device, the network device and the terminal device.

In some embodiments, if the source node is the control device 110 and the destination node is the terminal device 101, both the first and the second messages may be, for example, an attach accept message, a TA update accept message, or an initial context setup request message. The difference between them lies in that the first message is in the form of a S1-AP message due to the S1-MME interface between the control device 110 and the network device 120, and the second message is generated in the form of a RRC message because there is a LTE-Uu interface between the terminal device 101 and the network device 120.

Alternatively, in some embodiments, if the source node is the terminal device 101, and the destination node is the control device 110, both the first and the second messages may be, for example, a network attach complete message, a TA update complete message, or other suitable messages. In the meanwhile, the first message is in the form of a RRC message and the second message is in the form of a S1-AP message.

Figure 5A:
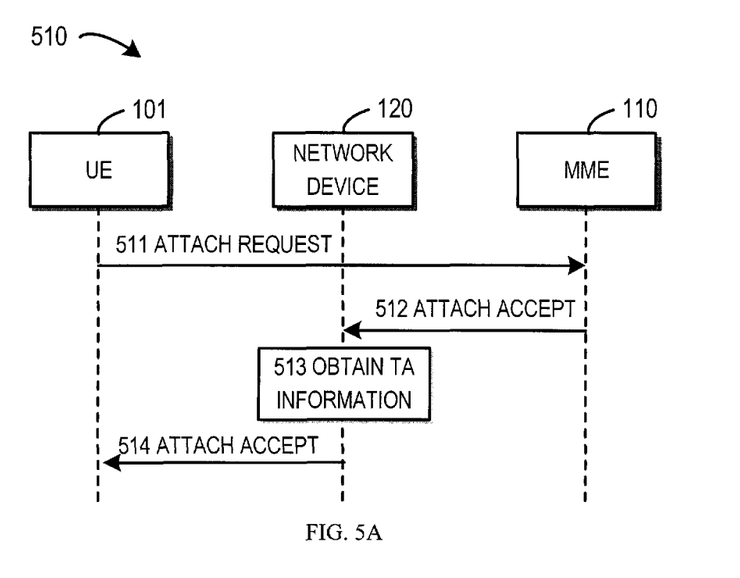
FIGS. 5A and 5B show diagrams 510 and 520 for obtaining TA information from a control device in accordance with embodiments of the present disclosure, respectively.
Figure 5B:
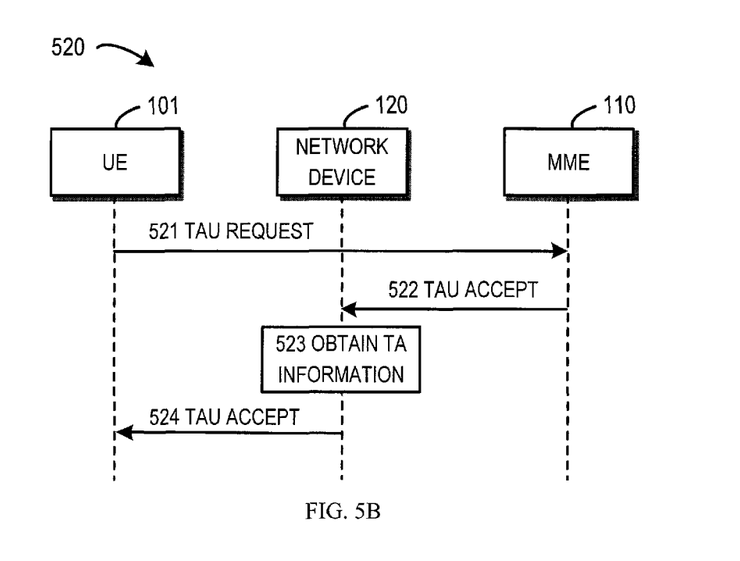

FIGS. 5A and 5B show diagrams 510 and 520 for obtaining TA information from a control device in accordance with embodiments of the present disclosure, respectively. In the embodiments illustrated in FIGS. 5A and 5B, the control device 110 (for example, a MME) informs the network device 120 (for example, a BS) the TA information, for instance, a TAI list, via a first message. The first message may be either in a standalone S1AP message or in the S1AP message which contain the corresponding NAS message. Then, the network device 120 may obtain the TA information and send a second message generated based on the first message to the terminal device 101 (for example a UE).

As shown in the embodiment of FIG. 5A, when the UE 101 wants to attach to CN, it may send 511 an attach request to MME. If the MME 110 accepts the request, it sends 512 an attach accept message to the network device 120. The Attach Accept message may be implemented as a separate message including the TA information. As an alternative, in an embodiment, the TA information may be included in an InitialContextSetupRequest message which contains the Attach Accept message. Thus, the network device 120 obtains 513 the TA information from the Attach Accept message. Then, the network device 120 sends 514 an attach accept message to the UE 101 according to predefined protocols.

As shown in the embodiment of FIG. 5B, if the UE 101 sends 521 a TA update (TAU) request message towards the MME 110, the MME may send back a TAU accept message as response. For example, the MME 110 may send 522 the TA information to the network device 120 in a separate TAU accept message or in a DLNASTransport message which contains the TAU accept message. The network device 120 obtains 523 the TA information from the TAU accept message or the DLNASTransport message. Then, the network device 120 sends 524 a TAU Accept message to the UE 101 according to predefined protocols.

In some embodiments of the present disclosure, the MME may only need to inform the network device the TA information only when the network device does not know this information or does not have updated information. In this way, the TA information can be transmitted on demand, which can reduce unnecessary overhead.

Figure 6A:
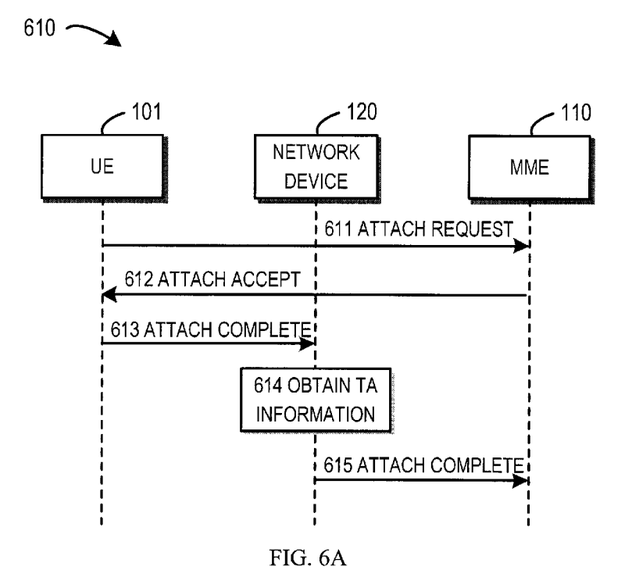
FIGS. 6A and 6B show diagrams 610 and 620 for obtaining TA information from a terminal device in accordance with embodiments of the present disclosure, respectively.
Figure 6B:
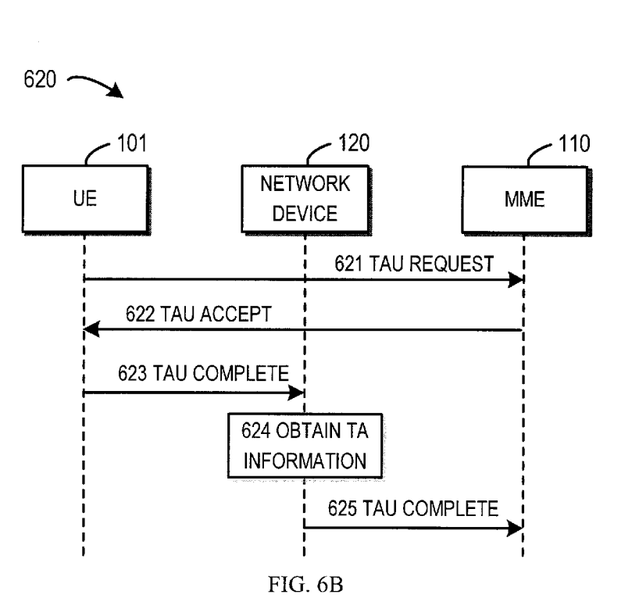

FIGS. 6A and 6B show diagrams 610 and 620 for obtaining TA information from a terminal device in accordance with embodiments of the present disclosure, respectively. In the embodiments illustrated in FIGS. 6A and 6B, the UE 101 informs the network device 120 the TA information. In the embodiments, after the UE 101 receives the TA information in a NAS message from the MME 110, it may include the TA information in a first message and send it toward the network device 120. This first message may be either in a standalone RRC message or in the RRC message which contain the NAS TAU message.

As shown in the embodiment of FIG. 6A, the UE 101 may first send an attach request to the MME 110. If the MME 110 accepts the request, it may send 612 an attach accept message to the terminal device 101. Then, the UE 101 may include TA information in an Attach Complete message and send 613 to the network device 120. Thus, network device 120 may obtain 614 the TA information and send 615 to the MME 110 an Attach Complete message generated according to the protocols between the network device 120 and the MME 110. The Attach Complete message may be a separate Attach Complete message, or may be a RRCConnectionSetupComplete message which contains the Attach Complete message.

As shown in the embodiment of FIG. 6B, if the UE 101 sends 621 a TAU request message towards the MME 110, the MME 110 may send 622 back a TAU accept message to the UE 101 as response. When the UE 101 sends 623 a TAU complete message, the UE 101 may include the TA information in a separate TAU complete message or in a ULInformationTransfer message which contains the TAU complete message. Upon receipt of the message, the network device 120 may obtain the TA information and send 625 to the MME 110 a TAU message generated according to the protocols between the network device 120 and the MME 110.

In some embodiments of the present disclosure, the UE 101 may only need to inform the network device 120 the TA information when the network device 120 does not have this TA information or does not have up to date information. In this way, the TA information can be transmitted on demand, which can reduce unnecessary overhead.

Figure 3:
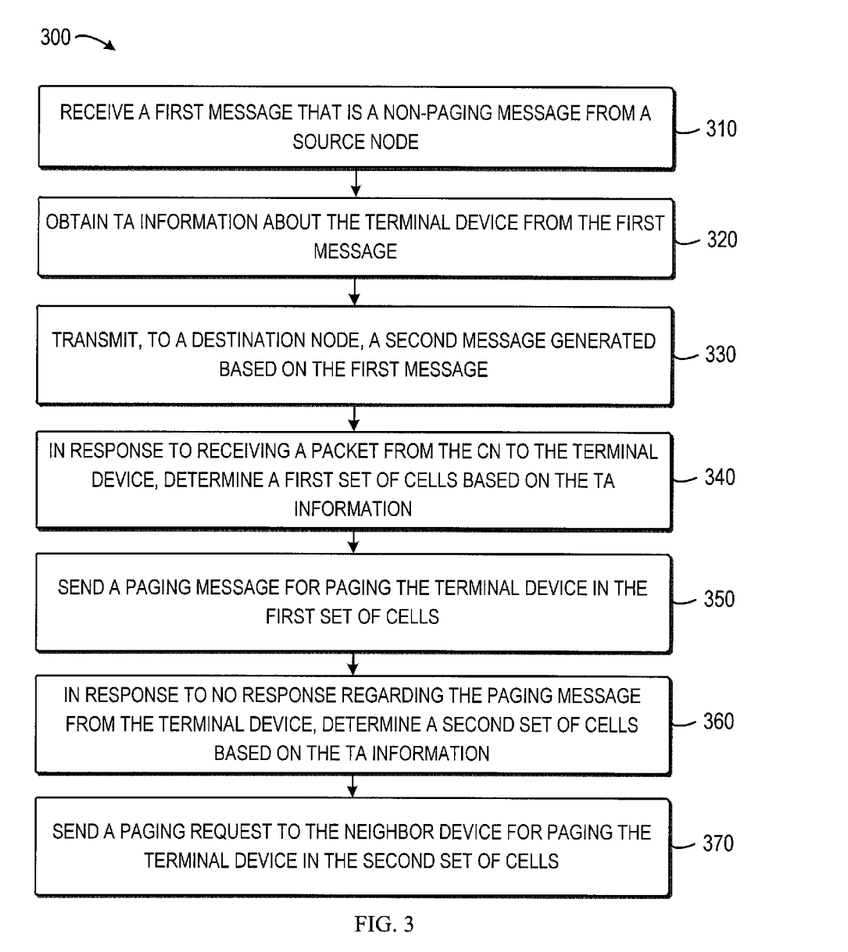
FIG. 3 shows a flowchart of a method 300 in accordance with an embodiment of the present disclosure.

Now reference is made to FIG. 3, which shows a flowchart of a method 300 in accordance with an embodiment of the present disclosure. It would be appreciated by those skilled in the art that the method 300 is an implementation of the method 200 and may be implemented by a network device. In embodiments of FIG. 3, the network device determines a set of cells for paging the terminal device based on the TA information. It is to be understood that the method 200 may be implemented in several ways as discussed above, and the method 300 is only one example instead of limitation.

The method 300 is entered in block 310, where the network device receives, from a source node, a first message that is a non-paging message, the source node being one of a terminal device and a control device in a CN. In block 320, the network device obtains TA information about the terminal device from the first message. In block 330, the network device transmits, to a destination node, a second message generated based on the first message, the destination node being the other of the terminal device and the control device. Blocks 310 to 330 are similar to blocks 210 to 230 and thus details are omitted here for purpose of conciseness.

In block 340, in response to receiving a packet from the CN to the terminal device, the network device determines a first set of cells based on the TA information. The first set of cells may include all cells managed by the network device and belong to a region where the terminal device has been registered. In block 350, the network device sends a paging message for paging the terminal device in the first set of cells. In block 360, in response to no response regarding the paging message from the terminal device, the network device determines a second set of cells based on the TA information. The second set of cells may include all cells managed by a neighbor device of the network device and belong to a region where the terminal device was registered.

In embodiments of the present disclosure, there may be several ways to determine the second set of cells. In an embodiment, the network device may obtain a TA code (TAC) of the neighbor device from message(s) exchanged with the neighbor device, e.g. X2SetupRequest, and then determine the second set of cells based on the TAC of the neighbor device. In another embodiment, the network device may exchange the TAC with the neighbor device, so as to obtain the TAC of the neighbor device, as well as provide its TAC to the neighbor device.

In block 370, the network device sends a paging request to the neighbor device for paging the terminal device in the second set of cells.

Figure 7:
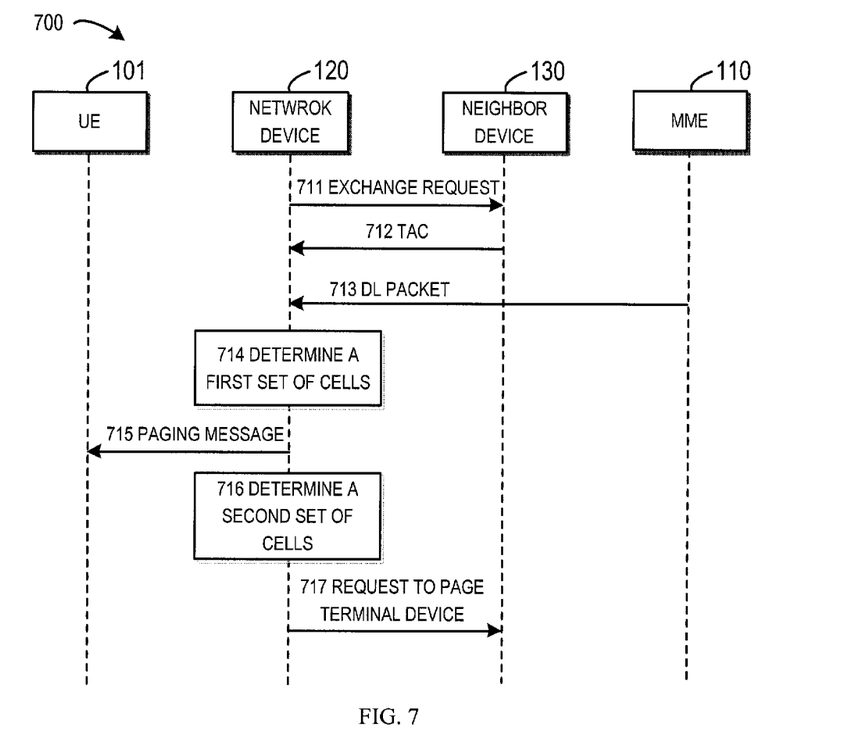
FIG. 7 shows a diagram 700 for paging based on the TA information in accordance with an embodiment of the present disclosure.

FIG. 7 shows a diagram 700 for paging based on the TA information in accordance with an embodiment of the present disclosure. In the example of FIG. 7, the terminal device 101 is illustrated as a UE and the control device 110 is illustrated as a MME. The network device 130 is illustrated as a neighbor device of the network device 120.

As shown in the example of FIG. 7, first, the network device 120 sends 711 an exchange request to the neighbor device 130 to exchange TAC with the neighbor device 130. If the neighbor device 130 agrees to exchange the TAC, it may send 712 its TAC to the network device 120. In a later time point, the MME 110 may have a downlink (DL) packet for the UE 101, and may send 713 the DL packet to the network device 120. Upon receipt of the DL packet from the MME 110, the network device 120 may determine 714 a first set of cells. The first set of cells includes all the cells managed by the network device 120 and belong to the TAI list that the UE 101 has been registered.

Then, the network device 120 sends 715 a paging message to the UE 101. If there is no response from the UE 101, the network device 120 may determine 716 a second set of cells by finding out neighbor cells which belong to the TAI list that the UE 101 has been registered. If the network device 120 finds that the neighbor cells are managed by the neighbor device 130, then it may send 717 a request to the neighbor device 130 to page the UE 101. Upon receipt the request, the neighbor device 130 may perform the paging. In this way, paging in the accessing network (for example, RAN) can be more accurate and more efficient.

Figure 4:
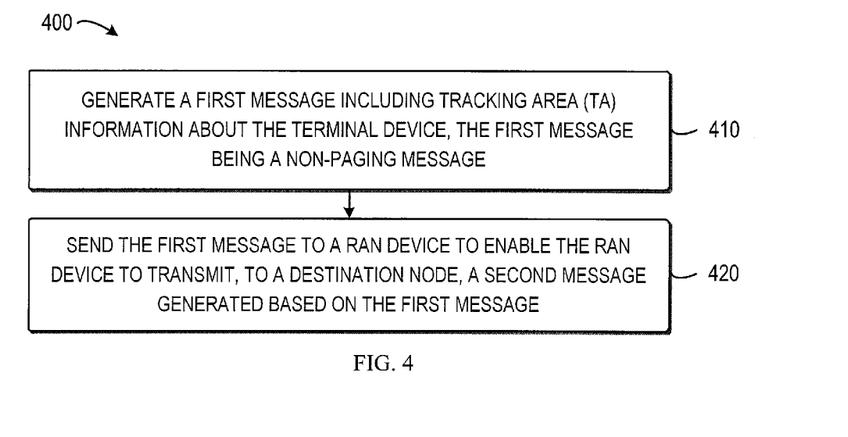
FIG. 4 shows a flowchart of a method 400 in accordance with an embodiment of the present disclosure.

Now reference is made to FIG. 4, which shows a flowchart of a method 400 in accordance with an embodiment of the present disclosure. With the method 400, the above and other potential deficiencies in the conventional approaches can be overcome. It would be appreciated by those skilled in the art that the method 400 may be implemented by a source node, for example, the control device 110, the terminal device 101, or other suitable device.

The method 400 is entered in block 410, where a first message including tracking area (TA) information about the terminal device is generated. The first message is a non-paging message.

In some embodiments, the source node is the control device, and the first message may be generated in several ways. In an embodiment, the control device, for example, a MME, may generate an attach accept message including the TA information as the first message, in response to receiving a network attach request from the terminal device.

As an alternative, in an embodiment, the control device may, in response to receiving a TA update request from the terminal device, generate a TA update accept message including the TA information as the first message.

As a further alternative, the control device may, in response to receiving a service request from the terminal device, generate an initial context setup request message including the TA information as the first message.

In some embodiments, the source node is the terminal device, and the first message may be generated in several other ways. In an embodiment, the terminal device may generate a network attach complete message including the TA information as the first message. Alternatively, the terminal device may generate a TA update complete including the TA information as the first message.

In block 420, the first message is sent to a network device to enable the network device to transmit, to a destination node, a second message generated based on the first message. According to embodiments of the present invention, if the source node is the terminal device, then the destination node is the control device. On the other hand, if the source node is the control device, then the destination node is the terminal device.

In this way, the TA information can be provided to the network device in a non-paging procedure. As such, overhead caused by broadcasting TA information from the CN can be reduced.

Figure 8:
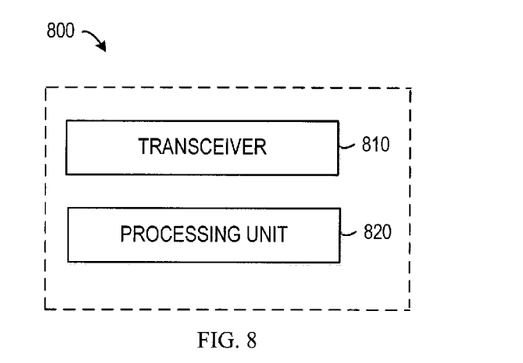
FIG. 8 shows a block diagram of a device 800 in accordance with an embodiment of the present disclosure.

FIG. 8 shows a block diagram of a device 800 in accordance with an embodiment of the present disclosure. It would be appreciated that the device 800 may be implemented as a network device, such as the network node 120 or other suitable devices.

As shown, the device 800 includes a transceiver 810 and a processing unit 820. The transceiver 810 is configured to receive, from a source node, a first message that is a non-paging message, the source node being one of a terminal device and a control device in a CN. The processing unit 820 is configured to obtain TA information about the terminal device from the first message. The transceiver 810 is further configured to transmit, to a destination node, a second message generated based on the first message, the destination node being the other of the terminal device and the control device.

In an embodiment, the source node is the control device, and the transceiver 810 may be further configured to: receive an attach accept message from the control device, the attach accept message being sent from the control device in response to a network attach request from the terminal device; receive a TA update accept message from the control device, the TA update accept message being sent from the control device in response to a TA update request from the terminal device; or receive an initial context setup request message from the control device, the initial context setup request message being sent from the control device in response to a service request from the terminal device.

In an embodiment, the source node is the terminal device, and the transceiver 810 may be further configured to: receive a network attach complete message from the terminal device; or receive a TA update complete message from the terminal device.

In an embodiment, the TA information may include a list of TAIs, a TAI identifying a region where the terminal device has been registered.

In an embodiment, the processing unit 820 may be further configured to: in response to receiving a packet from the CN to the terminal device, determine a first set of cells based on the TA information, the first set of cells including all cells managed by the network device and belonging to a region where the terminal device has been registered. The transceiver 810 may be further configured to send a paging message for paging the terminal device in the first set of cells.

In an embodiment, the processing unit 820 may be further configured to: in response to no response regarding the paging message from the terminal device, determine a second set of cells based on the TA information, the second set of cells including all cells managed by a neighbor device of the network device and belonging to a region where the terminal device was registered. The transceiver 810 may be further configured to send a paging request to the neighbor device for paging the terminal device in the second set of cells.

In an embodiment, the processing unit 820 may be further configured to: obtain a TAC of the neighbor device from message(s) exchanged with the neighbor device; and determine the second set of cells based on the TAC of the neighbor device.

Embodiments of the present disclosure also provide an apparatus implemented at a network device. The apparatus includes means for receiving, from a source node, a first message that is a non-paging message, the source node being one of a terminal device and a control device in a CN; means for obtaining TA information about the terminal device from the first message; and mean for transmitting, to a destination node, a second message generated based on the first message, the destination node being the other of the terminal device and the control device.

In an embodiment, the source node is the control device, and the means for receiving the first message may comprise: means for receiving an attach accept message from the control device, the attach accept message being sent from the control device in response to a network attach request from the terminal device; means for receiving a TA update accept message from the control device, the TA update accept message being sent from the control device in response to a TA update request from the terminal device; or means for receiving an initial context setup request message from the control device, the initial context setup request message being sent from the control device in response to a service request from the terminal device.

In an embodiment, the source node is the terminal device, and the means for receiving the first message may comprise means for receiving a network attach complete message from the terminal device; or means for receiving a TA update complete message from the terminal device.

In an embodiment, the TA information may include a list of TAIs. A TAI may identify a region where the terminal device has been registered.

In an embodiment, the apparatus may further include means for, in response to receiving a packet from the CN to the terminal device, determining a first set of cells based on the TA information, the first set of cells including all cells managed by the network device and belonging to a region where the terminal device has been registered; and means for sending a paging message for paging the terminal device in the first set of cells.

In an embodiment, the apparatus may further include means for, in response to no response regarding the paging message from the terminal device, determining a second set of cells based on the TA information, the second set of cells including all cells managed by a neighbor device of the network device and belonging to a region where the terminal device was registered; and means for sending a paging request to the neighbor device for paging the terminal device in the second set of cells.

In an embodiment, the means for determining the second set of cells may comprise: means for obtaining a TAC of the neighbor device from message(s) exchanged with the neighbor device; and means for determining the second set of cells based on the TAC of the neighbor device.

Figure 9:
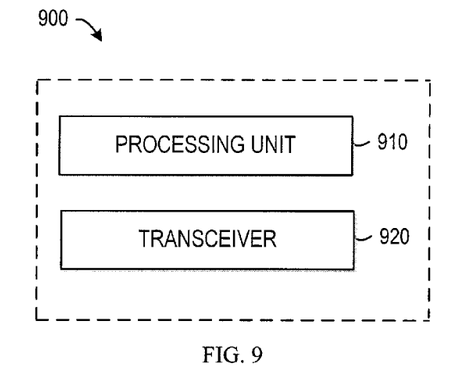
FIG. 9 shows a block diagram of a device 900 in accordance with an embodiment of the present disclosure.

FIG. 9 shows a block diagram of a device 900 in accordance with an embodiment of the present disclosure. It would be appreciated that the device 900 may be implemented as a source node, for example, the control device 110, the terminal device 101, or other suitable devices.

As shown, the device 900 includes a processing unit 910 and a transceiver 920. The processing unit 910 is configured to generate a first message including TA information about the terminal device. The first message is a non-paging message. The transceiver 920 is configured to send the first message to a network device to enable the network device to transmit, to a destination node, a second message generated based on the first message. The source node is one of the terminal device and the control device, and the destination node is the other of the terminal device and the control device.

Embodiments of the present disclosure also provide an apparatus implemented at a source node. The source node is one of a terminal device and a control device in a core network. The apparatus includes means for generating a first message including TA information about the terminal device, the first message being a non-paging message; and means for sending the first message to a network device to enable the network device to transmit, to a destination node, a second message generated based on the first message, the destination node being the other of the terminal device and the control device.

It should be appreciated that components included in the device 800 correspond to the operations of any of the methods 200-300, and components included in the device 900 correspond to the operations of the method 400. Therefore, all operations and features described above with reference to FIGS. 2-3 are likewise applicable to the components included in the device 800 and have similar effects, and all operations and features described above with reference to FIG. 4 are likewise applicable to the components included in the device 900 and have similar effects. For the purpose of simplification, the details will be omitted.

The components included in the device 800 or 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the device 800 or 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
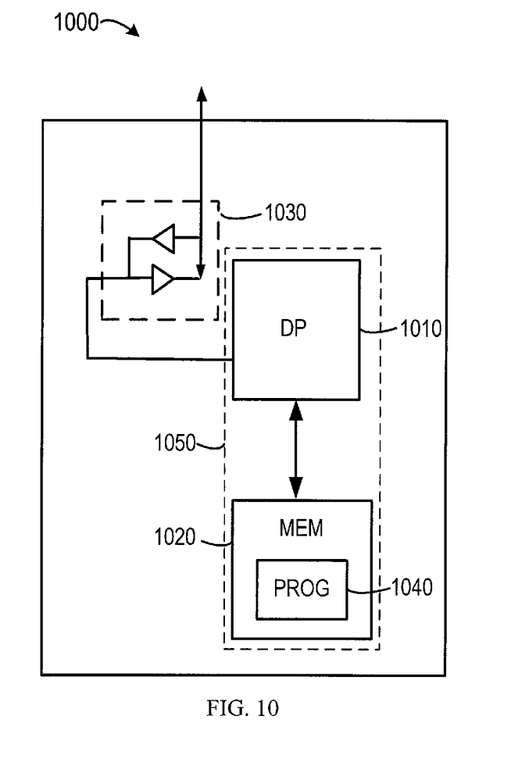
FIG. 10 shows a simplified block diagram 1000 of a device that is suitable for use in implementing embodiments of the present disclosure.

FIG. 10 shows a simplified block diagram of a device 1000 that is suitable for implementing embodiments of the present disclosure. It would be appreciated that the device 1000 may be implemented as at least a part of, for example, the device 800 or 900.

As shown, the device 1000 includes a communicating means 1030 and a processing means 1050. The processing means 1050 includes a data processor (DP) 1010, a memory (MEM) 1020 coupled to the DP 1010. The communicating means 1030 is coupled to the DP 1010 in the processing means 1050. The MEM 1020 stores a program (PROG) 1040. The communicating means 1030 is for communications with other devices in the same or different layer.

The PROG 1040 is assumed to include program instructions that, when executed by the associated DP 1010, enable the device 1000 to operate in accordance with the embodiments of the present disclosure, as discussed herein with the method 200, 300 or 400. The embodiments herein may be implemented by computer software executable by the DP 1010 of the device 1000, or by hardware, or by a combination of software and hardware. A combination of the data processor 1010 and MEM 1020 may form processing means 1050 adapted to implement various embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1000, there may be several physically distinct memory modules in the device 1000. The DP 1010 may be of any type suitable to the local technical environment, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a network device, comprising:
   receiving, from a source node, a first message that is a non-paging message, the source node being one of a terminal device and a control device in a core network (CN);
   obtaining tracking area (TA) information about the terminal device from the first message, the TA information comprising a list of tracking area identities (TAIs), each TAI identifying a region where the terminal device has been registered;
   transmitting, to a destination node, a second message generated based on the first message, the destination node being the other of the terminal device and the control device;
   in response to receiving a packet from the CN to the terminal device, determining a first set of cells based on the TA information, the first set of cells including all cells managed by the network device and belonging to a region where the terminal device has been registered;
   sending a paging message for paging the terminal device in the first set of cells;
   in response to no response regarding the paging message from the terminal device, determining a second set of cells based on the TA information, the second set of cells including all cells managed by a neighbor device of the network device and belonging to a region where the terminal device was registered; and
   sending a paging request to the neighbor device for paging the terminal device in the second set of cells.

2. The method according to claim 1, wherein the source node is the control device, and wherein receiving the first message comprises:
   receiving an attach accept message from the control device, the attach accept message being sent from the control device in response to a network attach request from the terminal device;
   receiving a TA update accept message from the control device, the TA update accept message being sent from the control device in response to a TA update request from the terminal device; or
   receiving an initial context setup request message from the control device, the initial context setup request message being sent from the control device in response to a service request from the terminal device.

3. The method according to claim 1, wherein the source node is the terminal device, and wherein receiving the first message comprises:
   receiving a network attach complete message from the terminal device; or
   receiving a TA update complete message from the terminal device.

4. The method according to claim 1, wherein determining the second set of cells comprises:
   obtaining a TA code (TAC) of the neighbor device from a message exchanged with the neighbor device; and
   determining the second set of cells based on the TAC of the neighbor device.

5. A network device, comprising:
   a transceiver configured to receive, from a source node, a first message that is a non-paging message, the source node being one of a terminal device and a control device in a core network (CN);
   a processing unit configured to obtain tracking area (TA) information about the terminal device from the first message, the TA information comprising a list of tracking area identities (TAIs), each TAI identifying a region where the terminal device has been registered,
   wherein the transceiver is further configured to transmit, to a destination node, a second message generated based on the first message, the destination node being the other of the terminal device and the control device;
   wherein the processing unit is further configured to determine a first set of cells based on the TA information in response to receiving a packet from the CN to the terminal device, the first set of cells including all cells managed by the network device and belonging to a region where the terminal device has been registered;
   wherein the transceiver is further configured to send a paging message for paging the terminal device in the first set of cells;
   wherein the processing unit is further configured to determine a second set of cells based on the TA information in response to no response regarding the paging message from the terminal device, the second set of cells including all cells managed by a neighbor device of the network device and belonging to a region where the terminal device was registered; and
   wherein the transceiver is further configured to send a paging request to the neighbor device for paging the terminal device in the second set of cells.

6. The network device according to claim 5, wherein the source node is the control device, and wherein the transceiver is further configured to:
   receive an attach accept message from the control device, the attach accept message being sent from the control device in response to a network attach request from the terminal device;
   receive a TA update accept message from the control device, the TA update accept message being sent from the control device in response to a TA update request from the terminal device; or
   receive an initial context setup request message from the control device, the initial context setup request message being sent from the control device in response to a service request from the terminal device.

7. The network device according to claim 5, wherein the source node is the terminal device, and wherein the transceiver is further configured to:
   receive a network attach complete message from the terminal device; or
   receive a TA update complete message from the terminal device.

8. The network device according to claim 5, wherein the processing unit is further configured to:
   obtain a TA code (TAC) of the neighbor device from a message exchanged with the neighbor device; and
   determine the second set of cells based on the TAC of the neighbor device.

9. A device, comprising:
   a processor and a memory, the memory containing program including instructions executable by the processor, the processor being configured to cause the device to perform the method according to claim 1.

10. A non-transitory computer readable storage medium including instructions which, when executed on a processor of a device, cause the device to perform the method according to claim 1.

* * * * *